United States Patent
Patil et al.

(10) Patent No.: US 7,404,070 B1
(45) Date of Patent: Jul. 22, 2008

(54) BRANCH PREDICTION COMBINING STATIC AND DYNAMIC PREDICTION TECHNIQUES

(75) Inventors: Harish G. Patil, Shrewsbury, MA (US); Joel S. Emer, Acton, MA (US); Stephen Felix, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 09/723,687

(22) Filed: Nov. 28, 2000

(51) Int. Cl.
G06F 9/00 (2006.01)
(52) U.S. Cl. ..................................... 712/239
(58) Field of Classification Search .................. 712/239
See application file for complete search history.

(56) References Cited

U.S. PATENT DOCUMENTS

| | | | | |
|---|---|---|---|---|
| 5,649,178 A | * | 7/1997 | Blaner et al. | 712/240 |
| 5,752,014 A | * | 5/1998 | Mallick et al. | 712/240 |
| 5,805,878 A | * | 9/1998 | Rahman et al. | 712/239 |
| 5,978,909 A | * | 11/1999 | Lempel | 712/240 |
| 6,247,122 B1 | * | 6/2001 | Henry et al. | 712/239 |
| 6,499,101 B1 | * | 12/2002 | Henry et al. | 712/239 |
| 6,550,004 B1 | * | 4/2003 | Henry et al. | 712/239 |

OTHER PUBLICATIONS

Intel. "Intel® Itanium® Architecture Software Developer's Manual vol. 3: Instruction Set Reference." Revision 2.1 Oct. 2002. pp. 3:6-3:8; 3:28-3:29; and 3:314-3:319.*
Tanenbaum, Andrew S. "Structured Computer Organization". Second Edition. Englewood Cliffs, NJ: Prentice-Hall, Inc., © 1984. pp. 10-12.*
*Combining Static and Dynamic Branch Prediction to Reduce Destructive Aliasing*; Haris Patil et al. (12 p.).
*PhD Dissertation Static Methods in Branch Prediction*; Donald Lindsay (2 p.).
*Intel® IA-64 Architecture Software Developer's Manual*; vol. 1; IA-64 Application Architecture; Revision 1.1; Jul. 2000 (4p.).
Donald Lindsay, *Static Methods In Branch Prediction*, PH.D. Thesis submitted 1998 (147 p.).
Intel® Itanium™ Architecture Software Developer's Manual, vol. 1: *Application Architecture, Revision 2.0*, Dec. 2001 (234 p.).

* cited by examiner

*Primary Examiner*—Aimee J Li

(57) ABSTRACT

A computer system comprises a processor that comprises a hardware branch predictor and software instructions executed by the processor. The software instructions comprise conditional branch instructions and separate static branch prediction instructions. The static branch prediction instructions comprise a plurality of groups of static branch prediction bits, each group being configurable to provide prediction information for a separate conditional branch instruction.

15 Claims, 2 Drawing Sheets

BRANCH PREDICTION COMBINING STATIC AND DYNAMIC PREDICTION TECHNIQUES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a pipelined, superscalar microprocessor. More particularly, the invention relates to branch prediction in a pipelined microprocessor. Still more particularly, the invention relates to combining static and dynamic branch prediction techniques.

2. Background of the Invention

A microprocessor comprises the logic, typically a semiconductor device, which executes software. Microprocessors thus fetch software instructions from memory and executes them. Each instruction generally undergoes several stages of processing. For example, the instruction must be fetched and decoded to determine the type of instruction (add, multiply, memory write, etc.). Then, the instruction is scheduled, executed and finally retired. Each stage of processing may take multiple clock cycles. It has been recognized that the next instruction to be executed by a processor can be fetched and entered into the processor's pipeline before the previous instruction is retired. For example, while one instruction is being scheduled, the next instruction can be fetched and decoded. Moreover, as the pipeline increases in length, the processor can have more instructions at various stages of processing.

The instructions that a computer programmer writes to implement a particular software program includes a variety of different types of instructions. One type of instruction is generically referred to as a "conditional branch" instruction. This instruction includes a condition that is checked and can either be true or false. For example, the condition might be to check whether a certain error condition exists. The error condition either exists or not. If the error condition currently exists, the condition is true, otherwise the condition is false (i.e., the condition does not exist). Consequently, one set of instructions is executed if the condition is true, and another set of instructions is executed if the condition is false.

Each instruction is stored at a unique address in memory. Typically, if a conditional branch instruction checks a condition that turns out to be false, then program execution follows to the next instruction following the conditional branch instruction. If the condition is true, however, program execution generally jumps to a different instruction and the processor continues executing from that instruction. Thus, the branch is either "taken" or "not taken" depending on whether the condition is true or not. If the condition is true, the branch is taken and the processor's instruction pointer is reloaded with a different address from the branch instruction to continue execution. If the condition is false, the branch is not taken and the instruction pointer is simply incremented so that the processor continues execution with the instruction immediately following the conditional branch instruction.

In a pipelined architecture, instructions may be fetched to enter the pipeline before a previously fetched conditional branch instruction is actually executed. Accordingly, pipelined processors include branch prediction logic that predicts the outcome of branch instructions before the branch instructions are actually executed. The branch predictor logic thus predicts whether the branch is likely to be taken or not, and thus which instructions are to be fetched following the fetching of a conditional branch instruction. The branch predictor merely predicts the future outcome of the conditional branch instruction; the true outcome will not be accurately known until the branch instruction is actually executed. If the branch predictor turns out to have made the correct prediction, then instructions that must be executed are already in the pipeline. If the prediction turns out to have been inaccurate, then the incorrect instructions that had been fetched must be thrown out and the correct instructions fetched. Performance suffers on mispredictions and increases on correct predictions. Choosing a branch prediction scheme that results in correct predictions much more often than mispredictions will result in the performance increase gained from correct predictions outweighing the performance hit on mispredictions.

Many processors use "dynamic" branch prediction techniques which means that the predictions is made in real-time by the processor's branch predictor. Most dynamic branch predictors predict the future behavior of branches using their past behavior (i.e., whether the branches had previously been actually taken or not). Simple branch prediction schemes use either the past behavior of the branch being predicted or the behavior of neighboring branches or combination of the two techniques.

Most simple branch predictors include a table of counters. The table typically includes multiple entries and each entry includes a prediction as to whether a conditional branch instruction will be taken or not. Once a conditional branch instruction is fetched, that instruction is used to point to ("index") one of the entries in the table. Various branch prediction schemes differ in the way this table is indexed. On encountering a conditional branch instruction in program flow, the table of counters is indexed for the given branch. The most significant bit of the counter at the indexed entry is used as the prediction for the branch. The counter is updated ("trained") once the outcome of the branch is known. Multi-level branch predictors have multiple tables where the final prediction is determined after a series of lookups with each lookup using the outcome of the previous lookup as the index. Hybrid branch predictors combine two or more simple branch predictors. A "meta-predictor" or "chooser" is used to select among the predictions from the component predictors. The training of a hybrid predictor may involve updating all of the component predictors or only a subset of the component predictors. Further, the training may depend on whether the prediction was correct or incorrect.

Depending on the indexing scheme and the size of the table of counters in a simple branch predictor, multiple branches in a program may share the same entry in the table of counters. This phenomenon is commonly known as "aliasing" and various branches are said to "collide" with one another. If two colliding branches behave the same way, the collision may in fact be "constructive" as the two branches drive the shared counter value in the same direction resulting in correct predictions for both colliding branches. On the other hand, if the two colliding branches behave differently, they will try to push the shared counter in different directions causing an increased number of mispredictions. Unfortunately, it has been shown that collisions in dynamic branch predictors are more likely to be destructive than constructive. The preferred embodiment of the present invention advantageously reduces the likelihood of destructive collisions between branches.

There are several approaches, however, to reducing the destructive aliasing problem noted above. First, the number of entries in the predictor table can be increased possibly causing branches that would have collided to index to different entries in the table. Second, an indexing scheme can be chosen that best distributes the available counters among different combinations of branch address and history. Third, conditional branch instructions can be separated into different classes with each class using a different prediction scheme. As such, branches in two different classes cannot interfere with one another.

One approach that has been suggested with regard to the third approach is to use a static prediction technique for some conditional branches and a dynamic prediction technique for other branches. Static branch prediction uses the results of pre-run-time analysis of the software. Static prediction uses the knowledge of program structure or profiles from previous runs of a program to accurately predict the run-time outcome of branches. Certain types of conditional branch instructions fairly consistently have the same outcome (take the branch or do not take the branch). For example, conditional branches that check for error conditions generally result in the take or do not take outcome associated with there not being an error. By contrast, dynamic branch prediction is performed during run-time while the program is executing and is performed each time the branch instruction is fetched.

One variation on the idea of combining static and dynamic branch prediction schemes was suggested in a Ph.D. dissertation entitled "Static Methods in Branch Prediction" by Donald Lindsay, Department of Computer Science, University of Colorado, 1998. Lindsay proposed modifying conditional branch instructions to include information as to whether the processor should use its own dynamic prediction logic or use static prediction. If static prediction was dictated by the instruction, then the prediction itself was encoded into the branch instruction.

While theoretically adequate, Lindsay's approach may not be possible to implement in an existing processor architecture in which the conditional branch instructions have no extra bits in which to encode the dynamic or static prediction choice and, for static prediction, the prediction itself. Thus, an improvement to Lindsay's proposed combination of static and dynamic branch prediction is needed.

BRIEF SUMMARY OF THE INVENTION

The problems noted above are solved in large part by a computer system having one or more processors. Each processor has a branch predictor which dynamically predicts each conditional branch instruction. Software written for the processors to execute includes static branch prediction instructions embedded in the software. Each branch prediction instruction includes a pair of predictor bits that corresponds to another instruction which may be a conditional branch instruction. The pair of bits encodes whether, assuming the corresponding instruction is a branch, the branch is predicted as taken or not taken. This information encoded in the branch prediction instruction overrides the dynamic branch predictor in the processor. If the corresponding instruction is not a branch or a static prediction is not desired, the pair of bits is encoded to instruct the processor not to use static prediction for the corresponding instruction.

The processor also includes fetch logic which fetches instructions. The static branch prediction instruction identifies itself to the processor by including a predetermined register identifier that corresponds to an unwriteable register in the processor. The fetch unit examines the fetched instructions for that predetermined value to identify the static branch prediction instructions.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
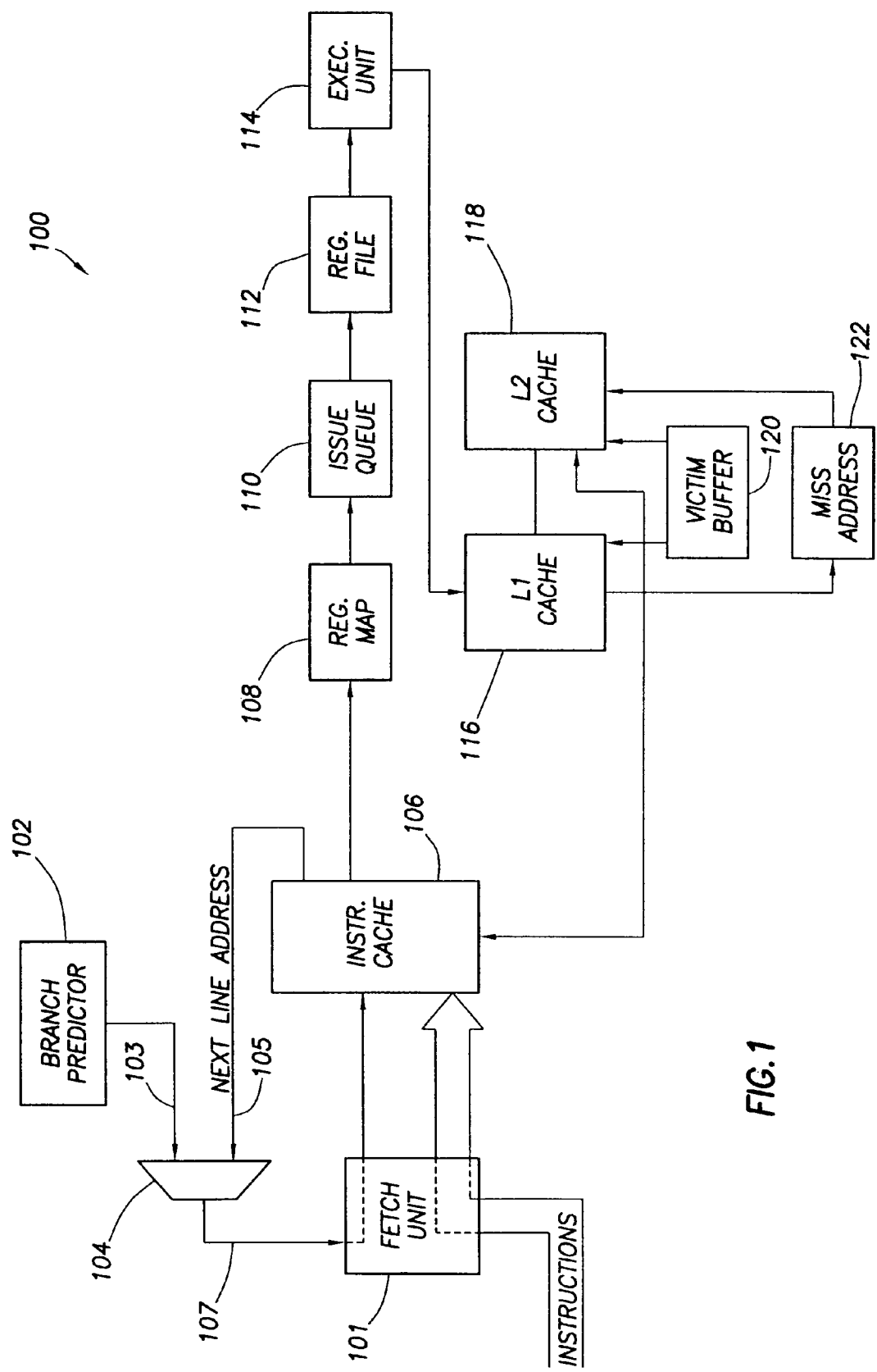
FIG. 1 shows a block diagram of a processor constructed in accordance with the preferred embodiment of the invention.

Referring now to FIG. 1, in accordance with the preferred embodiment of the invention, processor 100 generally comprises a fetch unit 101, a branch predictor 102, a multiplexer 104, an instruction cache 106, a register map 108, an issue queue 110, a register file 112, an execution unit 114, an L1 cache 116, an L2 cache 118, a victim buffer 120 and a miss address file 122. Other components (not specifically shown) or different components can be provided as desired. Further, one or more of the components shown in FIG. 1 can be implemented as a plurality of such components. For example, there may be more than one branch predictor 102, register map 108, issue queue 110, register file 112, execution unit 114, victim buffer 120 and miss address file 122. Additional such components may be provided to permit concurrent processing of multiple instructions through the processor. Further, a set of components 108-114 can be provided to process integer-type instructions and another set to process floating point-type instructions.

In general, the fetch unit 101 in the processor 100 fetches instructions from an external memory (not shown) and stores the fetched instructions into the instruction cache 106 which may provide, for example, 64 KB of storage. Further, the fetch unit 101 preferably contains decode logic (not specifically shown) to at least partially decode each instruction. This partial decoding function will be discussed below with regard to FIG. 2.

Instructions are then retrieved from the instruction cache 106 and provided to the register map 108. The register map 108 generally contains logic that forwards instructions to the issue queue 110. The register map 108 also preferably performs several other functions. For instance, the register map 108 eliminates register write-after-read and write-after-write data dependency while preserving true read-after-write data dependencies. This permits instructions to be dynamically rescheduled. Also, the register map 108 permits the processor 100 to speculatively execute instructions before the control flow previous to those instructions is resolved. The logic in the register map 108 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps.

The issue queue 110 receives instructions from the register map 108. The issue queue preferably has storage capacity for a suitable number of instructions per clock cycle. Instructions stored in the issue queue are kept there until they are ready to be further processed.

The register file 112 preferably contains storage for the processor's registers, results written by instructions that have not yet been retired, and other information as desired. The execution unit 114 comprises at least one execution unit, but preferably more than one for increased performance. Each execution unit executes one or more instructions.

The L1 cache 116 preferably is a data cache memory and ensures architecturally correct behavior for load and store instructions. The L1 cache may be, for example, a 64-KB virtually-addressed, multi-way, set-associative cache. If the target data for an instruction is currently in the L1 cache, the requested data is retrieved from the L1 cache. If the requested data is not in the L1 cache, the L2 cache 118 is examined to determine if the data is located therein. The L2 cache preferably has a larger storage capacity than the L1 cache. The victim buffer 120 is used if a cache block must be evicted from the L1 cache to make room for a new cache block. The miss address file buffer 122 preferably hold addresses of L1 cache misses.

The branch predictor 108 is used with regard to branch instructions. A branch instruction requires program execution either to continue with the instruction immediately following the branch instruction if a certain condition is met, or branch to a different instruction if the particular condition is not met. Accordingly, the outcome of a branch instruction is not known with 100% certainty until the instruction is executed. In a pipelined architecture, a branch instruction (or any instruction for that matter) may not be executed for at least several, and perhaps many, clock cycles after the processor 100 fetches the branch instruction. In order to keep the pipeline full, which is desirable for efficient operation, the processor includes branch prediction logic 102 that predicts the outcome of a branch instruction before it is actually executed (also referred to as "speculating"). The branch prediction logic 102 may predict the branch as either "taken" or "not taken." "Predict taken" means that the corresponding branch instruction will likely be taken when executed and the processor should begin fetching the instructions from the branch target. "Predict not taken" means that the branch instruction likely will not be taken and the processor should continue fetching instructions beginning with the instruction immediately following the branch instruction. The branch predictor 102, which receives instruction addresses from a queue (not shown), preferably bases its speculation on short and long-term history of prior instruction branches. As such, by using branch prediction logic, the processor's instruction fetching operation can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 102 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 102 uses any suitable branch prediction algorithm, however, that results in correct speculations more often than misspeculations. The branch prediction algorithm should be such that the overall performance of the processor is better (even in the face of some misspeculations) than if speculation was turned off completely.

The branch predictor operatively couples to the multiplexer 104 via information line 103. Information line 103 generally includes branch prediction information generated by branch predictor 102. Similarly, the instruction cache 106 couples by way of a "next line address" 105 to the multiplexer 104. The next line address 105 includes the address of the next line of instructions in the instructions cache. Under control by control logic (not specifically shown), the multiplexer 104 selects either the branch prediction information on line 103 or the next line address 105 as the output pointer 107 which is provided back to the instruction cache 106 via the fetch unit 101. The pointer 107 represents the address of the location in the instruction cache 106 from which instructions are to be retrieved and provided to the register map 108. As such, the instructions may either be branch predicted instructions dynamically determined by the branch predictor 102 or, as explained below, statically determined by the instructions themselves or simply the next sequential series of instructions in program order.

In addition to the hardware-based branch prediction logic 102 included within processor 100, the preferred embodiment of the invention uses a second branch prediction technique. This second branch prediction technique is embodied in the software instructions themselves. This technique is referred to above as "static" prediction. In general, the software program being executed by processor 100 has encoded within it branch prediction information regarding one or more of the software branch instructions. This software-encoded information informs the processor 100 whether the branch instruction associated with the encoded information is predicted as taken or not taken. That is, the software includes information that tells the processor either to:

ignore the processor's hardware branch predictor 102 and predict the branch instruction as taken or not taken; or use the taken/not taken prediction made by the branch predictor 102

As such, the software encoded branch prediction information represents an override to the processor's hardware branch predictor. This static prediction technique is advantageous for various types of conditional branch instructions (e.g., branch instructions that check for error conditions) for which the outcome is usually the same (either taken or not taken).

The static prediction scheme discussed herein is different than the static prediction described above with regard to Lindsay's Ph.D. dissertation which encoded the static prediction information in the conditional branch instruction itself. Although Lindsay's proposal is theoretically sound, the disadvantage of Lindsay's proposed technique is that it is impractical to implement with an existing instruction set the processor manufacturer prefers not to or cannot modify.

Instead, in accordance with the preferred embodiment of the invention, static branch prediction preferably is implemented in an instruction that is not the conditional branch instruction. For purposes of this disclosure, the instruction that includes the static branch information is referred to as the "static branch prediction instruction." As is explained below, the static branch prediction instruction includes various bits that statically predict as either taken or not taken one or more associated conditional branch instructions. Other information, however, can be included in the static branch prediction instruction if desired and thus the name, "static branch prediction instruction," should not be taken to imply that the instruction only includes branch prediction information.

Figure 2:
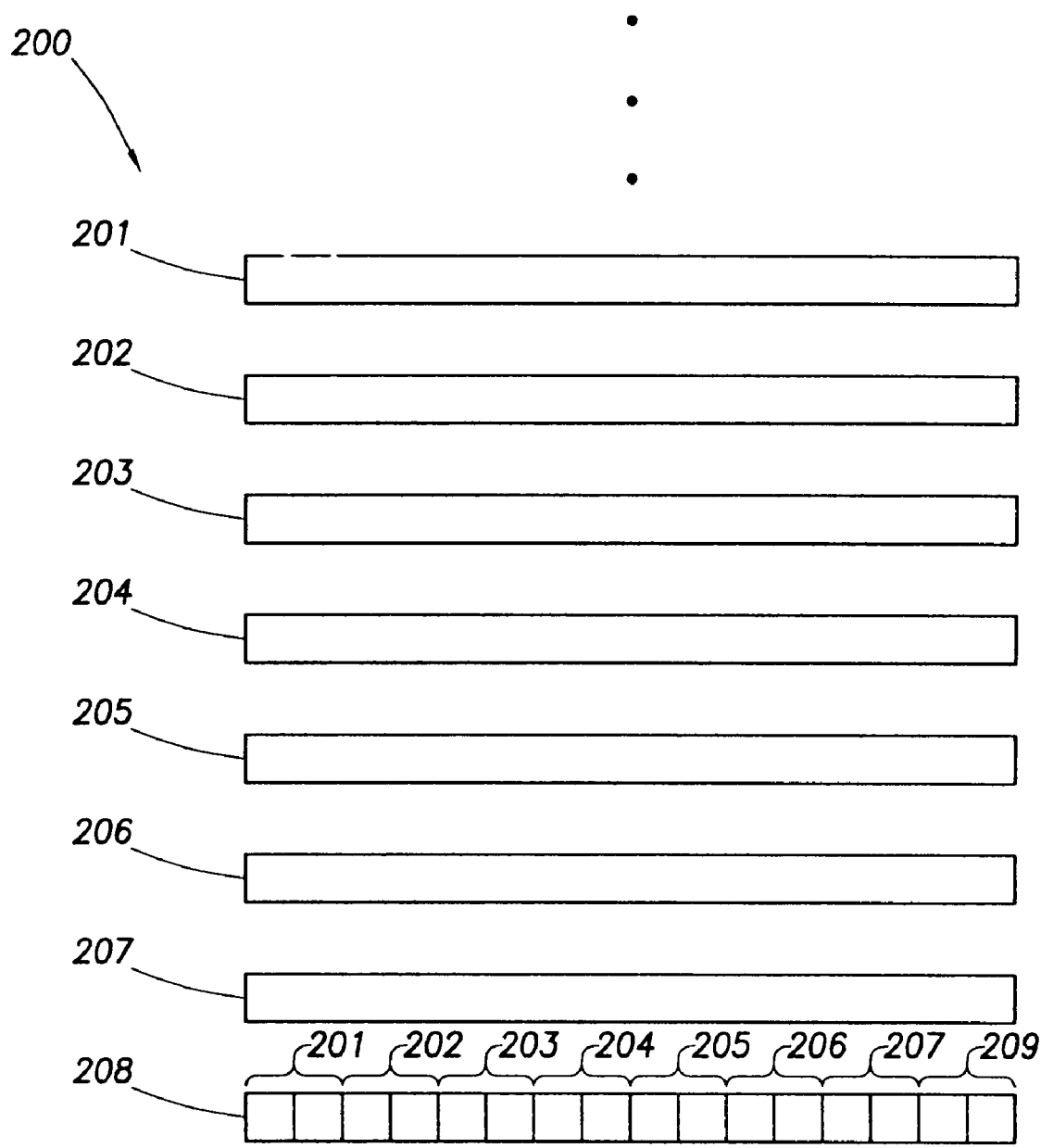
FIG. 2 shows a preferred embodiment of the invention whereby an instruction is dedicated to indicate, for each conditional branch in a group of instructions, whether each conditional branch is predicted taken, predicted not taken or whether the processor's branch prediction logic should be used to predict the branch.

Referring now to FIG. 2, one suitable technique for implementing the static branch prediction instruction in accordance with the preferred embodiment is shown. Each rectangular block 201-208 represents an executable software instruction in a program 200. There may be instructions preceding instruction 201 and other instructions that follow instruction 208. Instructions 201-207 represents any type of instructions such as conditional branch instructions, load instructions, store instructions, add instructions, multiply instructions, etc. Instruction 208 represents the static branch prediction instruction noted above. Preferably, the program 200 includes one static branch prediction instruction 208 for every group of seven instructions that includes a conditional branch instruction. Alternatively, the program 200 can include one static branch prediction instruction 208 for every n instructions where n is more or less than 7.

One suitable implementation of a software static branch prediction instruction may have the form of or be represented by a load instruction such as:

LDA R31, <prediction information>

The preceding instruction loads the <prediction information> value into an internal processor register called R31. In accordance with the preferred embodiment of the invention, however, R31 is a register identifier that does correspond to unwriteable architectural register internal to the processor. The destination register R31 identifies the instruction as a static branch prediction instruction to the processor. The fetch unit 101 and in particular the decode logic identified previously in the fetch unit, pre-decodes each instruction fetched and examines the instructions for the R31 value. Once the fetch unit 101 finds a load instruction having R31 as the destination register, the fetch unit determines the instruction to be a software static branch prediction instruction. The <prediction information> field of the instruction includes static prediction information regarding one or more conditional branch instructions in a group (e.g., 7) of instructions associated with the prediction instruction as shown in FIG. 2. The processor preferably does not load a register with the prediction information bits, but rather extracts the prediction information bits to be used for branch prediction, as explained below.

Referring still to FIG. 2, static branch prediction instruction 208 includes 16 bits of prediction information as shown, and may have other bits of information that are not shown, but that are unrelated to the branch predictions. The 16 branch prediction bits are grouped in pairs of two bits. Each pair of branch prediction bits provides a prediction for a corresponding instruction 201-208. Thus, as shown, the first two pairs of bits provides the static prediction for instruction 201. The second pair of bits provides the static prediction for the instruction 202, and so on. As shown, only seven pairs (i.e., 14 bits) are used to provide the relevant static prediction information for the seven instructions 201-207. The remaining pair of bits 209 can be used for other purposes or be ignored.

In accordance with the preferred embodiment of the invention, each pair of static prediction bits in the static branch prediction instruction 208 is encoded as follows:

TABLE 1

Encoding of Static Prediction Bits

| Static Prediction Bits | Prediction |
| --- | --- |
| 00 | Do not use static prediction |
| 01 | Do not use static prediction |
| 10 | Use static prediction and predict taken |
| 11 | Use static prediction and predict not taken |

As shown in Table 1, if the pair of static prediction bits is "00" or "01," then no static branch prediction is to be used for the corresponding instruction. This situation is used in several situations. For instance, the instruction corresponding to the pair of static branch prediction bits encoded as 00 or 01 may simply not be a conditional branch instruction, and if that is the case, then branch prediction is not applicable. Further, the prediction bits can be encoded not to use static prediction even for corresponding instructions that are conditional branches. In this case, the processor 100 uses the prediction supplied by the processor's hardware branch predictor 102. This may be desirable for various reasons. For example, certain types of conditional branch instructions may be difficult to statically predict. For instance, conditional branch instructions in which the branch is both taken and not taken with relatively high frequency are difficult to statically predict. Thus, rather than statically predicting those types of instructions, it may be desired to permit the processor's internal hardware branch predictor 102 (FIG. 1) to predict the branch.

Static branch prediction bits encoded as "10" signify to the processor 100 that the corresponding branch instruction is to be predicted taken. In this case, the processor 100 ignores the branch predictor 102 and, instead, begins fetching instructions from the branch specified in the corresponding branch instruction itself.

Finally, static branch prediction bits encoded as "11" signify to the processor 100 that the corresponding branch instruction is to be predicted as not taken. In this case, the processor again ignores the prediction supplied by the processor's branch predictor 102 and continues fetching instructions beginning with the instructions following the corresponding conditional branch instruction.

In further accordance with the preferred embodiment of the invention, the processor 100 maintains a log of the branch history in the branch predictor 102. This log is used by the dynamic branch predictor to compute the index into its internal table. Preferably, the outcomes of both the statically and dynamically predicted branches are added to this log. By maintaining a history log of the statically predicted branch as well, the processor's hardware branch predictor 102 may be able to more successfully perform dynamic branch prediction.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor that comprises a hardware branch predictor; and
   software instructions executed by said processor, said software instructions comprising conditional branch instructions and separate static branch prediction instructions;
   said static branch prediction instructions comprise a plurality of groups of static branch prediction bits, each group being configurable to provide prediction information for a separate conditional branch instruction; and
   wherein said processor predicts one or more condition branch instructions by executing said static branch prediction instructions.

2. The computer system of claim 1, wherein each group of static branch prediction bits comprises a pair of bits.

3. The computer system of claim 2 wherein each pair of prediction bits corresponds to another instruction and each pair of prediction bits is encoded as: 00 and 01 mean do not use static prediction, 10 means predict taken and 11 means predict not taken.

4. The computer system of claim 1 wherein said prediction information comprises a member selected from the group consisting of: do not use static prediction, predict taken, and predict not taken.

5. The computer system of claim 1 wherein said static branch prediction bits comprise static branch prediction information that comprises encoded information directing the processor to ignore the predictions supplied by the hardware branch predictor.

6. The computer system of claim 1 wherein said hardware branch predictor comprises a log in which the results of all executed conditional branch instructions are stored.

7. A processor, comprising:
   fetch logic that fetches program instructions from a source external to said processor;
   a dynamic branch predictor coupled to said fetch logic, said dynamic branch predictor supplies predictions regarding conditional branch instructions to said fetch logic;
   an instruction queue coupled to said dynamic predictor, said fetch logic storing fetched instructions in said instruction queue; and
   an execution unit coupled to said instruction queue and executing instructions provided from said instruction queue;
   said fetch logic examines fetched instructions for a predetermined register identifier that identifies that instruction as a static branch prediction instruction that provides separate static branch prediction information about a plurality of conditional branch instructions.

8. The processor of claim 7, wherein said separate static branch prediction information for each conditional branch instruction comprises a pair of bits.

9. The processor of claim 7 wherein said prediction information comprises a member selected from the group consisting of: do not use static prediction, predict taken, and predict not taken.

10. The processor of claim 7 wherein said static branch prediction instruction comprises branch prediction bits that directs said fetch logic to ignore the predictions supplied by the dynamic branch predictor.

11. The processor of claim 7 wherein said dynamic branch predictor comprises a log in which the results of all executed conditional branch instructions are stored.

12. The processor of claim 7 wherein said predetermined identifier comprises a register identifier.

13. A method of predicting the outcome of conditional branch instructions, comprising:
   including a static branch predictor software instruction in a program, said branch prediction software instruction including branch prediction information configurable to pertain to a plurality of conditional branch instructions in the program;
   fetching said branch prediction software instructions;
   decoding said branch prediction software instructions to determine if said decoded instruction is a branch prediction software instruction; and
   if said decoded instruction is a branch prediction software instruction, then predicting at least one conditional branch instructing based on said branch prediction information; and
   if said decoded instruction is not a branch prediction software instruction, then executing said decoded instruction.

14. The method of claim 13 wherein said branch prediction information comprises pairs of bits, each pair corresponding to another instruction.

15. The method of claim 14 further comprising decoding said pairs of bits to determine whether, for said other instruction corresponding to said pair, said other instruction is predicted taken, predicted not taken or no static branch prediction is provided.

* * * * *